United States Patent [19]
Gestermann et al.

[11] Patent Number: 6,165,332
[45] Date of Patent: Dec. 26, 2000

[54] ELECTROCHEMICAL HALF-CELL WITH PRESSURE COMPENSATION

[75] Inventors: Fritz Gestermann, Leverkusen; Hans Dieter Pinter, Wermelskirchen, both of Germany

[73] Assignee: Bayer Aktiengesellschaft, Leverkusen, Germany

[21] Appl. No.: 09/194,787
[22] PCT Filed: May 26, 1997
[86] PCT No.: PCT/EP97/02689
§ 371 Date: Aug. 26, 1999
§ 102(e) Date: Aug. 26, 1999
[87] PCT Pub. No.: WO97/47787
PCT Pub. Date: Dec. 18, 1997

[30] Foreign Application Priority Data

Jun. 7, 1996 [DE] Germany .................. 196 22 744

[51] Int. Cl.⁷ .................................................. C25B 9/00
[52] U.S. Cl. .................... 204/258; 204/265; 204/266; 204/277; 204/278
[58] Field of Search ................... 204/256, 258, 204/284, 265, 266, 270, 278, 277

[56] References Cited

U.S. PATENT DOCUMENTS 4,657,651  4/1987  Wainerdi .
5,650,058  7/1997  Wenske et al. .............. 204/265 X
5,693,202  12/1997  Gestermann et al. .

FOREIGN PATENT DOCUMENTS 2164789  6/1996  Canada .
717 130  6/1996  European Pat. Off. .
44 44 114  9/1996  Germany .

OTHER PUBLICATIONS

Patent Abstracts of Japan, vol. 095, No. 011, Dec. 26, 1995 & JP 07 220728 A (Tanaka Kikinzoku Kogyo KK; Others: 01), Aug. 18, 1995.

"Meeting Abstracts 96–1, Abstract No. 949, Spring Meeting May 5—Oct. 1996" of the Electrochemical Society.

*Primary Examiner*—Donald R. Valentine
*Attorney, Agent, or Firm*—Norris McLaughlin & Marcus P.A.

[57] ABSTRACT

The invention relates to an electrochemical half cell (1) comprising at least one electrode space (3, 15) for receiving an electrolyte (100), a gas space (2), and at least one gas diffusion electrode (14) as anode or cathode separating the gas space (2) and electrode space (3, 15), in which the gas space (2) is subdivided into two or more superimposed gas pockets (2a, 2b), in which gas inflow and gas outflow takes place through separate openings (7) and (12a, 12b, 12c, 12d) and the pressure on the electrolyte side of the electrode (14) is compensated by an opening in the respective gas pocket (2a, 2b) for the electrolyte.

14 Claims, 9 Drawing Sheets

ELECTROCHEMICAL HALF-CELL WITH PRESSURE COMPENSATION

This application is a 371 of PCT/EP97/02689, filed May 26, 1997.

The present invention relates to an electrochemical half cell comprising at least one electrode space for receiving an electrolyte, a gas space, and at least one gas diffusion electrode as anode or cathode and separating the gas space and electrode space, in which the gas space is subdivided into two or more superimposed or overlying gas pockets in which gas inflow and gas outflow takes place through separate openings and the pressure on the electrolyte side of the electrode, when compared with the pressure on the gas side of the electrode, is compensated by an opening in the gas pockets for the electrolyte.

The operation of electrochemical cells based on gas diffusion electrodes, for example for use as an oxygen consumption cathode in alkali halide electrolysis, is basically known and is described for example in U.S. Patent Specification 4,657,651.

The gas diffusion electrode is an open-pore membrane between the electrolyte and gas space, which has an electrically conducting layer with catalyst and is intended to enable an electrochemical reaction, for example reduction of oxygen, to take place at the triple-phase boundary between electrolyte, catalyst and reactant gas in the membrane. The boundary layer is generally held in the membrane by the surface tension of the electrolyte on the hydrophobic electrode material opposing the hydrostatic pressure of the electrolyte on the membrane. However, in this connection only a small pressure drop between the gas side and liquid side of the membrane is permissible. If the gas-side pressure is too high, the gas finally penetrates the membrane and interferes with the operation of the electrode in this region, and the electrolysis process is interrupted. If on the other hand the liquid pressure is too high, the triple-phase boundary is forced out from the region containing the catalyst in the membrane, which likewise interferes with the operation of the cathode and, if there is a further rise in pressure, causes liquid electrolyte to penetrate the gas space. With vertically arranged electrodes, as is necessary for example with membrane electrolysers, in order to be able to remove the desired product chlorine efficiently, this limits the structural height of the gas diffusion electrodes since otherwise at the top of the electrode gas will penetrate the cathode space and also at the bottom of the electrode electrolyte liquid will penetrate the gas space. The technically realisable structural height is therefore limited to ca. 20–30 cm, which is unattractive for conventional industrial membrane electrolysis units.

In order to solve the problem of pressure compensation, various arrangements have been proposed in the prior art.

According to U.S. Patent Specification 4,657,651, pressure compensation between the gas space and the electrolyte space on both sides of a gas diffusion cathode is achieved by subdividing the cathode into individual horizontal chambers that are individually charged with gas, the gas pressure being regulated by passing the outflowing gas stream in each case into vertical chambers in such a way that their depth corresponds to the height of the electrolyte over the respective chamber. The disadvantage of this arrangement is the complexity and cost of the equipment, which stands in the way of a technical implementation. Moreover, the pressure in each individual gas chamber has to be adjusted separately, through respective valves.

The still unpublished German patent application No. P 4 444 114.2 describes an electrochemical half cell with a gas diffusion electrode, in which pressure compensation between the gas space and the electrolyte space on both sides of a gas diffusion electrode is achieved by subdividing the gas space into two or more gas pockets superimposed in a cascade-like manner, which are separated from one another and are open at the bottom to the electrolyte so that the pressure in each gas pocket is in equilibrium, via the opening for the electrolyte, with the pressure of the liquid column of the electrolyte in the corresponding part of the electrode space in front of the gas diffusion electrode, and in which any gas inflow and outflow takes place through the openings for the electrolyte.

In the publication "Meeting Abstracts 96-1, Abstract No. 949, Spring Meeting May 5–10/1996" of the "Electrochemical Society", a cell with an oxygen diffusion cathode was disclosed for chlor-alkali electrolysis on a laboratory scale, which is a simplified version of the concept of pressure compensation corresponding to German patent application No. 4 444 114.2. FIG. 1 of Abstract No. 949 shows a subdivision of the gas space in front of the oxygen cathode into two superimposed gas pockets, in which oxygen bubbling from the floor of the cell flows in through free openings of the gas pockets. Pressure compensation is achieved by the vertical subdivision of the gas space into two gas pockets. The maximum pressure acting on the membrane corresponds to the hydrostatic pressure corresponding to the height of the individual gas pockets.

The design and construction of the aforementioned electrolytic cell have a number of disadvantages that interfere with the operation of the diffusion electrode.

The gas inflow and outflow take place through the same opening of a gas pocket for the electrolyte. The exchange of the reactant gas contained in the respective gas pocket is thereby considerably disturbed since gas fed to the pocket continues to bubble uniformly over the lower edge of the gas pocket to the next higher gas pocket. A certain amount of mixing simply takes place on account of the bursting of the gas bubbles in the gas space behind the electrode. The active outflow and removal of undesired foreign gases from the gas space of the cell is not possible in the known electrolysis cell.

Furthermore, the rising gas bubbles can be trapped only to a limited extent by the equally widely projecting collecting apron of the upper gas pocket. Simple experiments show that most of the gas bubbles flow past the upper collecting apron of the known electrolysis cell.

The bursting of the gas bubbles at the meniscus of the electrolyte in the respective gas pocket moreover results in the formation of an undesirable spray mist of electrolyte droplets in the gas space, which precipitates on the diffusion electrode and interferes with its functioning.

The object of the invention, which represents an improvement of the prior art, is to develop an electrochemical half cell that has the advantages of simple pressure compensation but at the same time does not have the aforementioned disadvantages of the known cells, and that in particular permits an active ventilation of the gas space behind the diffusion electrode.

This object is achieved according to the invention by an electrochemical half cell, which is the subject of the invention, comprising at least one electrode space for receiving an electrolyte, a gas space, and at least one gas diffusion electrode as anode or cathode separating the gas space and electrode space, in which the gas space is subdivided into two or more superimposed gas pockets that are separated from one another and each of which has an opening for the electrolyte, so that the pressure in each gas pocket is in equilibrium, via the opening for the electrolyte, with the pressure of the liquid column of the electrolyte in the corresponding part of the electrode space lying in front of the gas diffusion electrode, characterised in that the gas inflow and the gas outflow of the individual gas pocket are spatially separated from one another.

In particular, the gas inflow and the gas outflow in a gas pocket are arranged laterally displaced relative to one another so that there is a lateral flow of the electrode gas in the gas pocket.

Because of the enforced flow of the electrode gas, gas exchange in the respective gas pocket is improved and the accumulation of undesired foreign gases, which for example occurs in the known cell arrangement, is avoided.

In addition, the isothermal direct contact of the electrode gas with the electrolyte means that the gas on the gas side of the diffusion electrode is always saturatedly wet and a "crystallising out" of electrolyte substances, especially in the membrane structure of the diffusion electrode, is thereby avoided.

This in turns prevents irreversible damage to the electrode by crystals of electrolyte.

In a particular embodiment of the invention the gas pockets are formed as allround closed chambers, one of whose boundary walls is the gas diffusion electrode and which have at a side end the gas feed or inflow for electrode gas. Excess electrode gas is removed at another side end of the gas pockets through a dip tube dipping into the pressure-compensating, stagnant electrolyte liquid. Because of this arrangement of gas feed on one side and removal of excess gas on the other side of the gas pocket, there is an active forced lateral flow of electrode gas through the gas pockets. With this cell arrangement pressure compensation between the gas space and electrode space takes place via the gas outflow. An advantage compared with the simple arrangement is that through the above design and construction of the half cell, an active gas exchange takes place in the gas pocket, which can be controlled by altering the amount of excess gas. This prevents any possible enrichment of interfering foreign gases in the gas pockets. Furthermore, it is thus possible to use less pure electrode gas or also— depending on the intended use of the half cell—to remove possibly formed product gas from the electrode reaction.

In a preferred variant of the invention the forced lateral ventilation of the half cell with electrode gas is achieved by alternately arranging the gas inflow and gas outflow from a gas pocket to the next higher-lying gas pocket so that the gas outflow of a gas pocket is located underneath the gas inflow of the next higher-lying gas pocket.

The gas pockets can have collecting aprons that are secured to the rear wall of the gas pocket. In the simplest form a guide plate or baffle for collecting the gas bubbles ascending from a lower gas pocket outlet is arranged vertically on the rear wall of the gas pocket and projects laterally over the outlet of the gas pocket outflow located thereunder.

Compared with an arrangement known from the prior art with superimposed gas pockets whose gas collecting aprons form part of the rear wall of the gas pockets, the above arrangement has the advantage that the half cell according to the invention can be designed and constructed to be much narrower since the gas collecting apron of the known arrangement projects a long way back from the gas diffusion electrode, whereas the vertical height of the laterally arranged gas collecting aprons, viewed from the electrode surface, can be kept small.

In a variant of the invention, instead of the lateral gas collecting aprons, a bubble channel can be used as gas inflow for the gas pockets, which projects downwardly and opens into the electrolyte. The bubble channel is for example arranged above the outlet of the gas outflow of a lower gas pocket, so that exiting electrode gas bubbles up into the bubble channel. The bubble channel can have a laterally widened bubble trap at its lower end.

In another variant the lower outlet is formed as a U-tube, one of whose arms projects a bit more widely and opens out into the opening of the bubble channel.

The aforementioned variants permit a transfer of electrode gas from gas pocket to gas pocket, so that the gas bubbles of electrode gas arriving at the meniscus of the electrolyte fluid still burst in a region outside the actual gas pocket. This avoids the rear side of the diffusion electrode being sprayed with electrolyte. This beneficial feature is in particular also achieved if the bubble channel or the gas collecting apron is laterally displaced, for example moved to the middle of the half cell, opposite the opening to the chamber of the gas pocket. In this case the gas collected in the bubble channel or gas collecting apron is passed laterally through a pipe to the opening.

This produces a particularly efficient cleaning and removal of spray mist. Any "pulsations" caused by the bursting of gas bubbles are not transmitted to the gas pocket.

The inlet of the gas feed to each gas pocket can be designed differently. Besides using a simple opening, a plurality of superimposed openings or one or more inlet slits, extending at most over the height of the gas pocket, may be provided in order for example to supply the rear side of the electrode with fresh electrode gas over its whole height.

In order to trap spray mist the openings can be covered with baffles as blocking means opposite the electrode wall, on which electrolyte possibly entrained with the gas stream settles out and can flow back.

A further variant of the pressure-compensated half cell according to the invention has, instead of an electrode gas flow running from a gas pocket to the overlying gas pocket, an individual feed for the individual superimposed gas pockets by means of gas feed lines which, depending on the circumstances, are equipped with their own control and shut-off valves.

The pressure compensation of the individual gas pockets occurs in each case via the gas outflow of the gas pockets, which dips openly into the electrolyte.

This preferred arrangement is advantageously employed if for example harmful gases are formed in the electrode reaction that inhibit this reaction, and which can accumulate in the case of a meandering gas flow from the lowest gas pocket up to the uppermost gas pocket.

This arrangement also enables part of the gas diffusion electrode surface to be "disconnected" by flushing the selected gas pocket with an inert gas (for example a noble gas). In this way it is possible to control and monitor the individual performance of the "disconnected" electrode surface when the half cell is operating.

In all the aforementioned embodiments of the invention the gas pressure in the region of each gas pocket corresponds to the liquid column of the respective outlet opening or of the lower edge of the bubble meniscus up to the upper edge of the liquid column between the gas pocket cascade and the rear wall of the electrolysis cell. This pressure is compensated by the liquid column in the electrode chamber, the equilibrium lying at the respective gas outlet opening or lower edge of the aforementioned bubble meniscus when both chambers are filled to the same height (e.g. when both chambers are hydraulically connected to one another). Since a homogeneous pressure prevails in the relevant gas pocket, on average a slight excess pressure exists on the gas side, which is also desirable in terms of optimum functioning, for example of catalytic oxygen reduction.

If in a further preferred variant of the half cell according to the invention the electrode space and the rear wall electrolyte space are hydraulically separated, then the respective differential pressure, which is of course the same for all chambers, can be specifically adjusted by different filling levels or outflow heights in both chambers.

For example, a controllable excess pressure can be adjusted by separate gas removal through a pipe passing upwardly to the gas discharge line and an optionally provided electrolyte receiver arranged thereabove, which is then for all gas pockets at the same height relative to the electrode space.

If on the other hand outflow of electrolyte from the cell preferably takes place downwardly through a stand pipe or also optionally at a side wall of the cell, it is directly possible to remove electrolyte and excess gas together by allowing the electrolyte from the electrode space to flow exclusively upwardly over the gas pocket electrode into the rear electrolyte space, from where it flows downwardly from the cell through the stand pipe together with the excess oxygen, or in the case of a lateral outflow, also to the side. Different heights of the stand pipe produce different differential pressures, this time the liquid pressure being greater than the gas pressure, which is of advantage particularly when the whole surface of the pocket-like gas diffusion electrodes is in contact with the current distribution grid. If desired, retaining and clamping devices for the electrode can then in fact be omitted. In a perfectly similar way to the joint removal of electrolyte and excess gas via the stand pipe, this removal can also be effected through a discharge pipe arranged laterally on the half cell, the separation of gas and electrolyte taking place for example in a collector as well as the cell. Furthermore, in this way the liquid pressure can be adjusted higher than the gas pressure over the gas diffusion electrode.

The half cell according to the invention can be expanded by an appropriate number of gas pockets to any arbitrary and technically feasible size. Since the amount of gas (e.g. oxygen) required for typical electrolysis loads is for example 0.7 to 1 standard cubic meter per square meter of cathode surface per hour, the necessary gas transport can be achieved without any problem by choosing a suitable size for the bubble openings, as hydraulic tests have demonstrated.

The retention and electrical contact of the gas diffusion electrode, especially in half cells of membrane electrolysis devices, is basically known. When using several electrode segments as gas diffusion electrode, the gas diffusion electrode segments are held in a gastight manner with respect to one another and to the electrode space.

The retaining elements for the gas diffusion electrode may be designed for example as clamping strips or suitably encased magnetic strips, which above all serve as installation aids.

In the case of electrolysis cells with an interposed ion exchange membrane, after assembly and installation the retaining elements may be supported via the ion exchange membrane against the counterelectrode structure lying behind the latter and thus provide for a sufficient compression against the gas diffusion electrode, which is thereby also brought into electrical contact.

The retaining elements may in the case of an electrolysis cell have notches aligned in the flow direction, on the side of the cell facing the ion exchange membrane, which notches permit a homogeneous flowthrough from compartment to compartment of the electrode space also when the electrolysis cell is braced or clamped.

By means of a suitable distribution of the inflow notches, for example with an increasing number of notches from the bottom upwards, an extra hydraulic pressure loading on the lower electrode compartments is avoided.

In a particularly advantageous arrangement of the invention an elastic spacer fills up the narrow electrode space, which not only acts as a spacer and turbulence generator for the electrolyte stream, but can also be mounted over the aforementioned retaining elements and clamped together with the latter, thereby forming a further elastic component for compressing and sealing the gas diffusion electrode.

In another embodiment the spacing between the gas diffusion electrode and membrane is ensured by sheathed wires, which are passed vertically through the individual compartments and are clamped in the notches of the retaining elements.

The retention of the gas diffusion electrode segments can also be effected by means of a T-shaped retaining device, whose longer arm terminates in appropriate sections in clips that are inserted in such a way through the retaining structure that the latter can be tightened from the back, for example by means of clamping wedges driven through suitably arranged bores. The gas diffusion electrode and optionally a seal are thus pressed by means of the short arm of the T-shaped retaining device in such a way against the retaining structure, which is designed as a low impedance power supply, that gastightness as well as a good current contact are ensured.

Current can be supplied to the gas diffusion electrode by arrangements known per se. Preferably current is fed through the retaining device of the gas diffusion electrode, which in turn is connected in a low-impedance manner together with the rear side of the electrolysis cell to an external power supply, an additional metallic grid structure being mounted on the retaining device, the gas diffusion electrode contacting the grid structure on the gas side or electrolyte side depending on the differential pressure between the electrolyte side and the gas side, and the grid structure providing short current paths. In the case of a gas diffusion electrode and integrated metallic grid, the separate metallic grid structure on the retaining device can optionally be omitted if the diffusion electrode can be supported in the direction of the gas space by another simple abutment.

The current may also preferably be supplied through a low impedance connection to the rear of the half cell.

An advantageous embodiment of the half cell according to the invention is characterised in that the whole structure of the gas pocket electrode is designed so that it can be removed from the half cell, for example an electrolysis half cell.

The half cell according to the invention can in principle be used in all electrochemical processes in which a gas diffusion electrode is operated in direct contact with a liquid electrolyte. Examples of the use of the half cell according to the invention include the following:

sodium dichromate electrolysis; a hydrogen consuming anode is used for example; hydrogen production at the cathode can be replaced by oxygen reduction at an oxygen consuming cathode;

hydrogen peroxide production by reducing oxygen at a gas diffusion cathode;

use in alkaline fuel cells, which are employed for example to concentrate sodium hydroxide solutions. The fuel cells can be operated with half cells corresponding to the invention, connected up as the anode for hydrogen conversion, and with half cells connected up as the cathode for oxygen reduction.

By means of the half cell according to the invention the conventional membrane electrolysers available on the market for electrolysing alkali halide solutions can in principle be converted to an energy-saving operation with for example oxygen consuming cathodes, as long as they have a sufficiently deep cathode chamber.

This applies in particular also to cell types with a vertical rib structure or vertical or horizontal internal structural ribs.

In principle all known types of gas diffusion electrodes can be used in conjunction with the half cell according to the invention, for example types with integrated metallic supporting grids or current distribution grids, or electrodes installed on carbon blocks or other conducting structures.

Further preferred embodiments of the half cell according to the invention are disclosed in the sub-claims.

The invention will now be illustrated in more detail with the aid of the figures, which however do not restrict the invention.

EXAMPLES

Example 1

Figure 2:
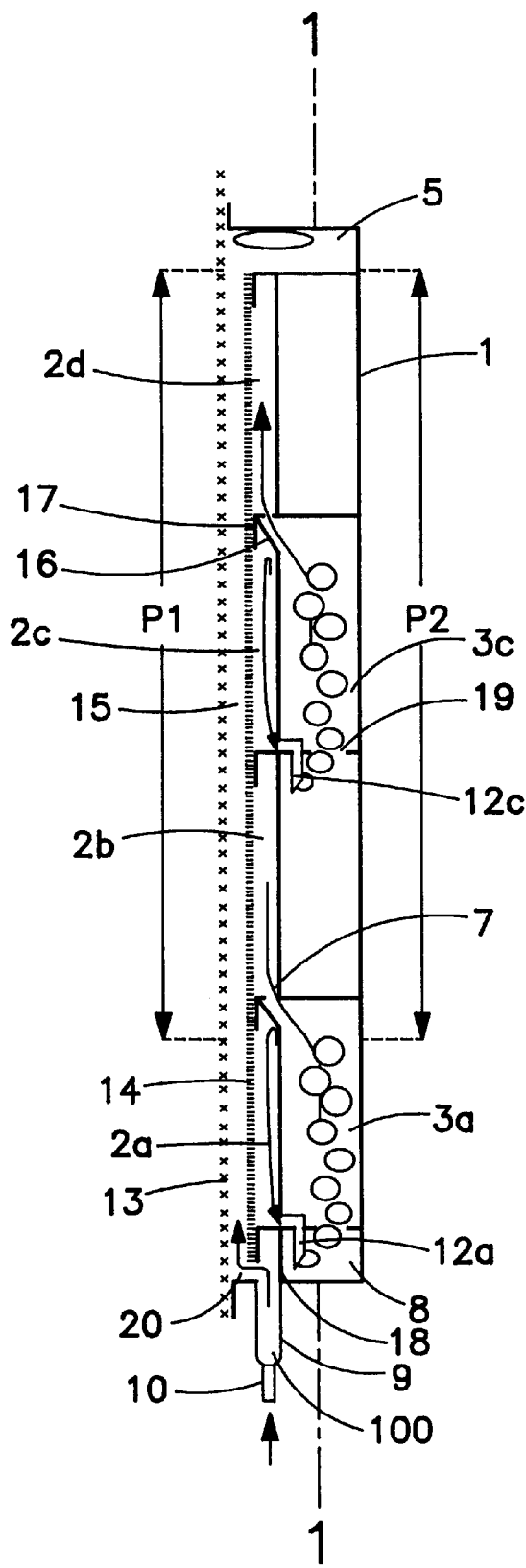
FIG. 2 is a cross-section through the half cell according to FIG. 1 corresponding to the line 2–2 in FIG. 1.

An electrochemical half cell connected up as an oxygen consumption cathode has the following basic design and construction (see FIG. 2).

The half cell 1 is separated from another half cell (not shown) by a membrane 13. Electrolyte 100 (in this case aqueous NaOH) is added through a feed line 9 to the electrolyte space 20 and flows between the membrane 13 and a gas diffusion electrode 14 through the electrolyte gap 15 to the collecting chamber 5. The electrode 14 is connected via a low impedance electrical contact (not shown) to an external power source.

The gas space 2 behind the diffusion electrode 14 is subdivided into superimposed gas pockets 2a, 2b, 2c and 2d. The rear space 3 behind the gas pockets 2a–2d contains electrolyte 100 that is in pressure equilibrium via the collecting chamber 5 with the electrolyte 100 in the electrolyte gap 15.

The various examples that follow basically differ from one another by the particular arrangement of the gas inflow and gas outflow of the gas pockets 2a–2d.

Figure 1:
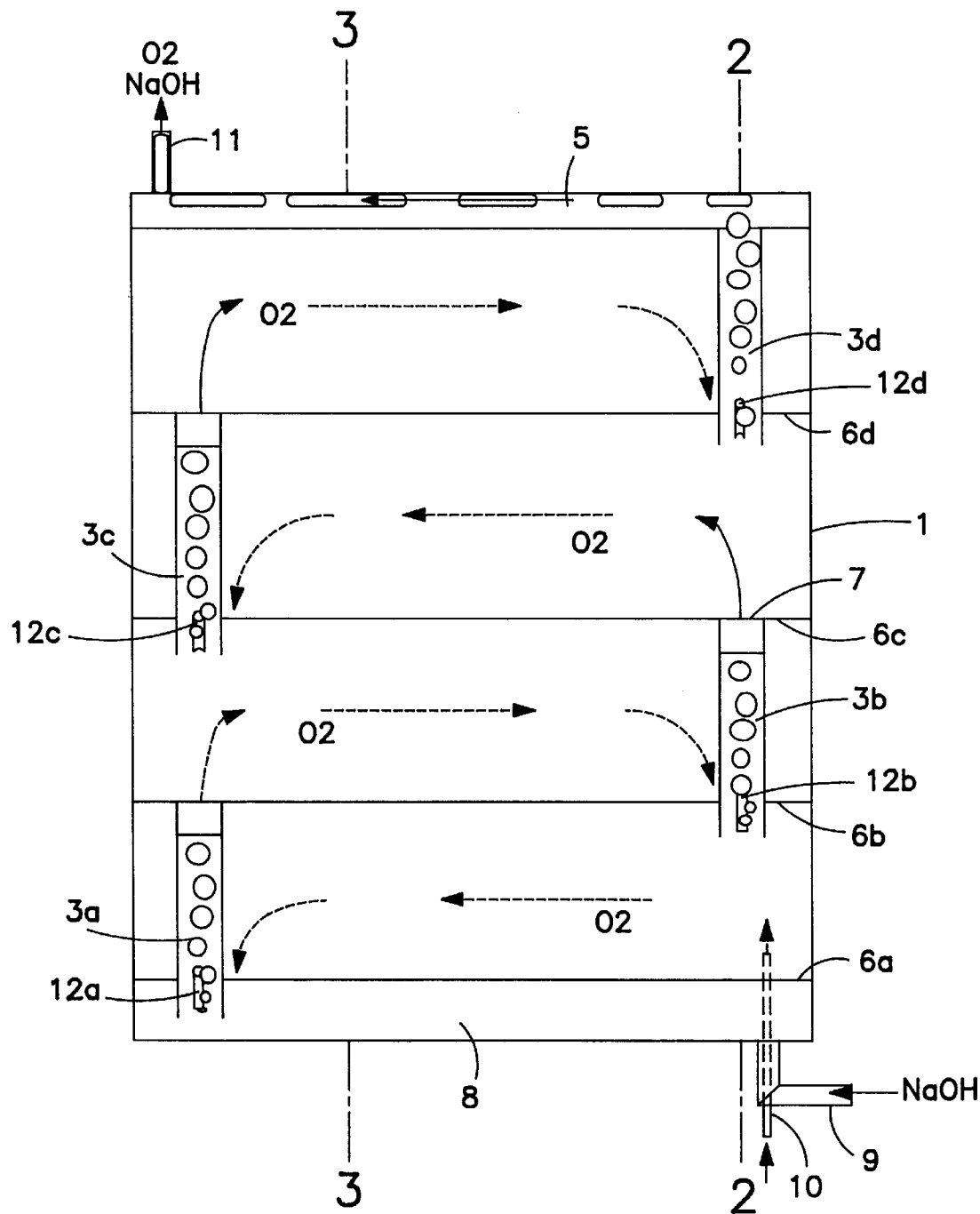
FIG. 1 is a variant of the half cell according to the invention, with bubble channels designed as oxygen consuming cathode, shown in cross-section parallel to the diffusion electrode surface.
Figure 3:
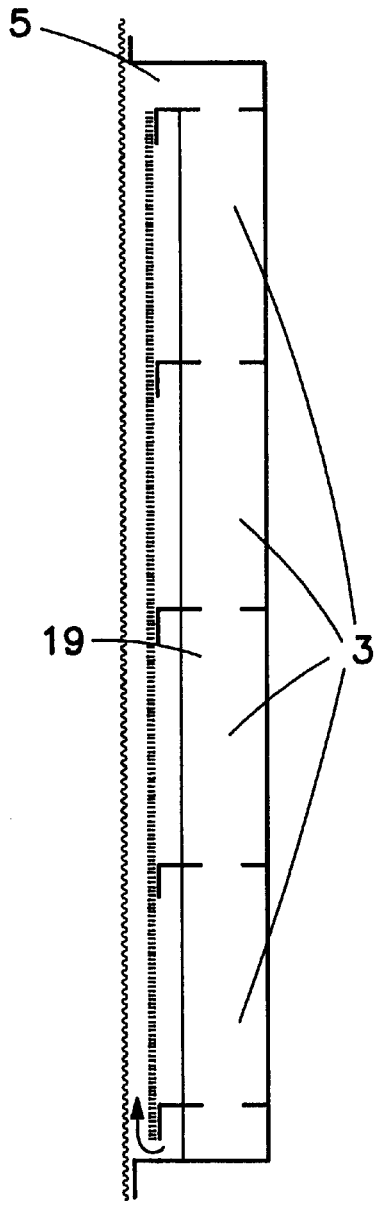
FIG. 3 is a cross-section through the half cell according to FIG. 1 corresponding to the line 3–3 in FIG. 1.

After the lowermost gas pocket 2a has been directly fed with gas, the excess gas is led through a dip tube 12a into a bubble channel 3a, as illustrated in FIG. 1. The bubble channel 3a is open at the top and is thus in communication with the pressure-compensating electrolyte 100 of the rear space 3. At the side and top the bubble channel 3a is closed as far as an opening 7 in the next higher gas pocket 2b. The rear side of the bubble channel 3a is formed either by the rear wall of the electrochemical half cell 1 (see FIG. 2: section 2–2) or by an independent closure wall (not shown). The latter structure enables for example the inserted gas pocket to be installed and dismantled independently. The ascending bubbles separate from the electrolyte in the upper region of the bubble channel 3a at the level of the meniscus, which is set by the end of the dip tube 12b to remove excess gas on the other side of the next higher gas pocket 2b, taking into account the bubble effects in the bubble channel 3a. The pressure compensation in the pressure-compensating back liquid, which in this case is the electrolyte 100 actively participating in the reaction, is effected through bores 19 in the rear structural elements 6a–6d (see FIG. 3, section 3–3). Active flow through the electrolyte gap 15 between the membrane 13 and gas diffusion electrode 14 is ensured by a baffle 18 between the rear space 3 and electrolyte distribution chamber 20, whereas in the upper collecting chamber 5 the electrolyte gas 15 and rear space 3 are connected to one another for the pressure compensation.

Example 2

Figure 4:
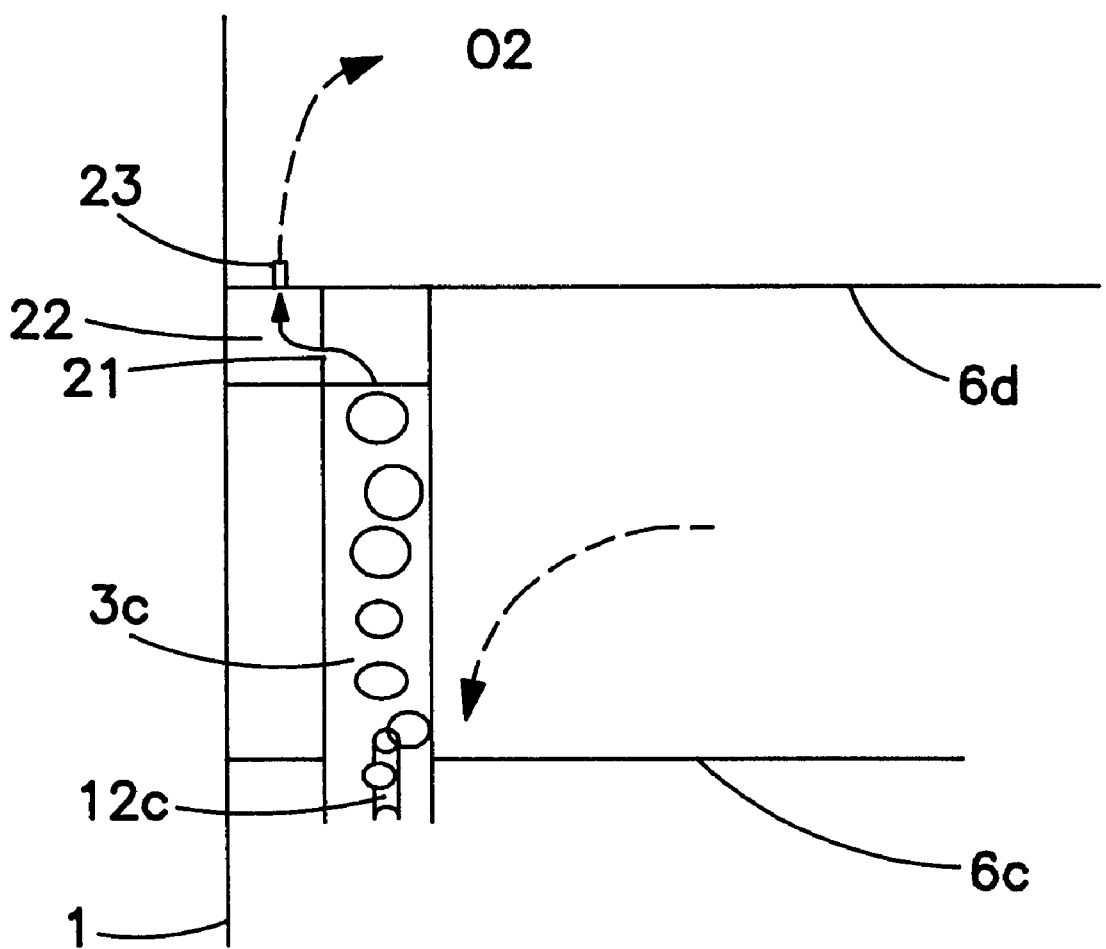
FIG. 4 is a detail of a variant of the half cell according to the invention according to FIG. 1, with separate gas feed.

In the particularly advantageous variant of the half cell 1 as illustrated in FIG. 1 and in more detail in FIG. 4, the bubble channels 3a–3d have no direct opening into the respective gas pockets 2a, 2b, 2c, 2d, but instead have a lateral connection 21 in the upper region of the accumulating gas bubbles in the region 22, which only opens downwardly, in addition to the bubble channel 3a–3d. The quiescent gas, freed from gas bubbles burst by the spray, is led from the region 22 through a bore 23 into the next gas pocket 2b–2d, as illustrated in FIG. 4. The horizontal arrangement of the bubble channels 3a–3d is arbitrary and is governed only by the structural boundary conditions of the respective electrochemical half cell. The decisive factor for the active flow through the gas pockets 2a, 2b, 2c and 2d is simply the, in each case, lateral arrangement of the gas inflow and outflow opening of each gas pocket 2a–2d, which in the case of the gas outflow is optionally realised by an internally situated and laterally displaced gas collecting tube (not shown) on the side opposite to the gas inflow.

In both cases the further addition of the electrode gas takes place in a cascade-like manner through similar sub-assemblies from lower gas pockets 2a–2c to the next higher gas pocket 2b–2d up to the discharge of the unconsumed electrode gas, which for example is removed together with the electrolyte through a pipe 11.

This variant is particularly suitable for electrolysers with vertically arranged structures.

Example 3

Figure 5:
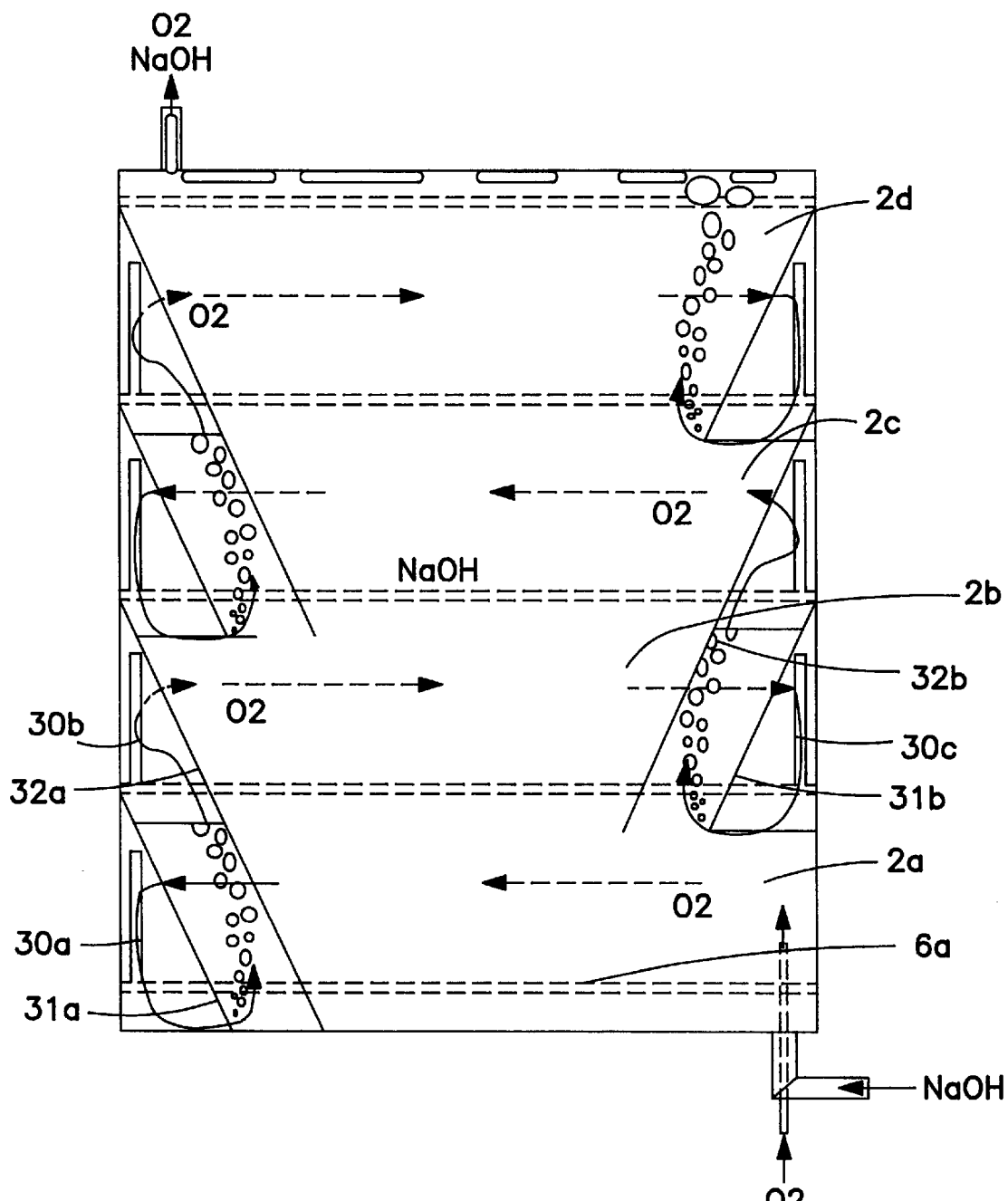
FIG. 5 is a cross-section of a half cell according to the invention with laterally extended gas collecting aprons.

A further alternative way of achieving pressure compensation is characterised by the following elements: after the lowermost gas pocket 2a has been charged with gas as described in Example 1 the excess gas leaves the gas pocket 2a, which is otherwise closed on all sides, through an opening 30a, corresponding to FIG. 5, and collects in the side apron 31a, which in turn is separately closed on the rear side or forms a gastight seal with the rear wall of the electrochemical half cell. The excess electrode gas bubbles through the side apron 31a, which is open at the bottom and is in communication with the pressure-compensating liquid, into the side apron 32a, which is of a similar construction to the apron 31a. The side apron 32a is extended laterally to a sufficient extent so that the ascending gas bubbles from the gas pocket 31a are more securely trapped. The electrode gas collects here and enters the next higher gas pocket 2b through the opening 30b. The excess gas leaves the gas pocket 2b through the opening 30c, where it collects in the side apron 31b, overflows, and is collected by the side apron 32b. The process is repeated in a cascade-like manner until the gas leaves the cell, in a similar manner to that described in Example 1. The essential feature is that the region outside the side aprons and behind the gas pockets 2a–2d is constantly filled with the pressure-compensating liquid. This arrangement enables a particularly flat half cell to be constructed.

Example 4

Figure 6:
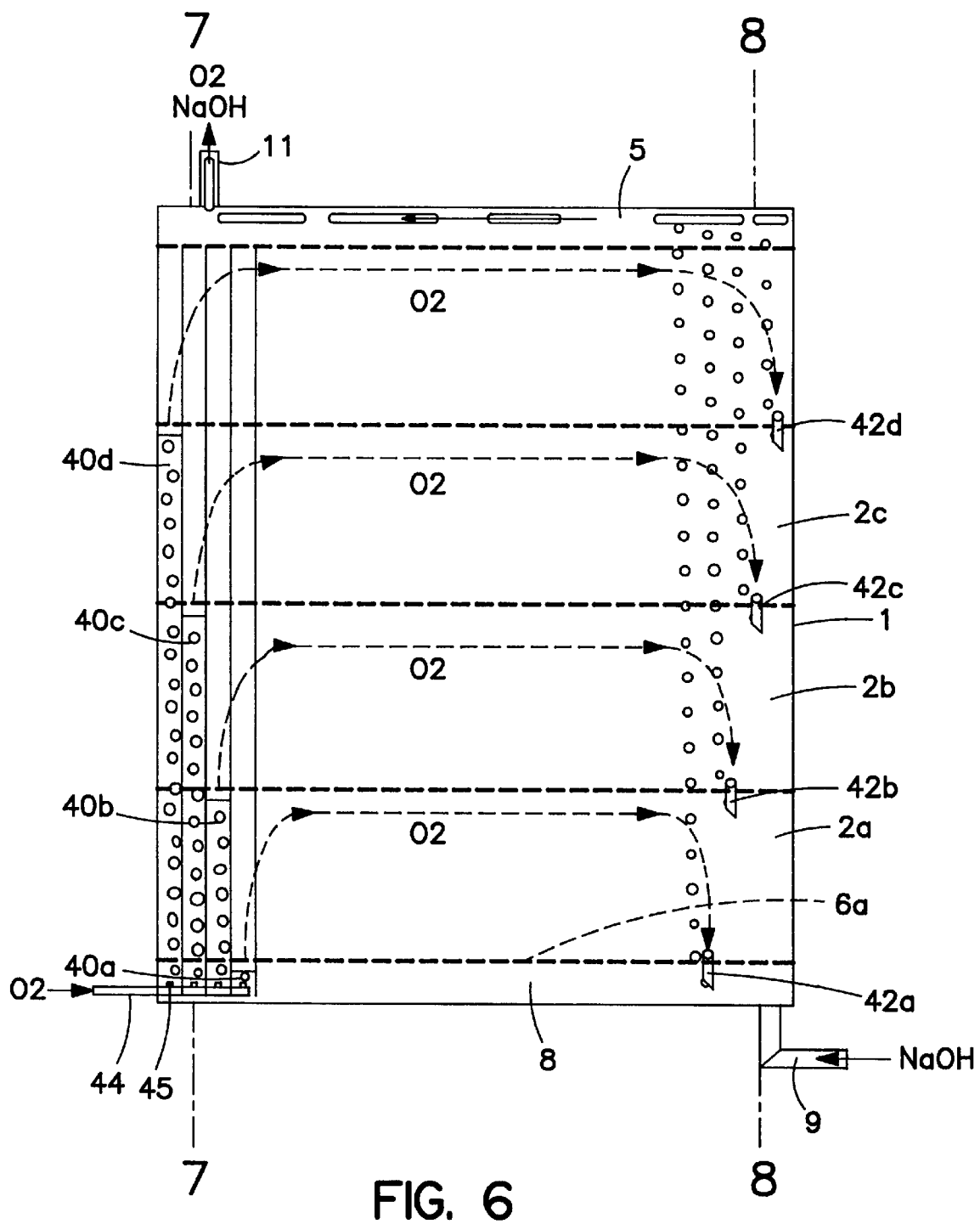
FIG. 6 is a cross-section of an example of the half cell according to the invention with direct gas feed to the individual gas pockets.
Figure 7:
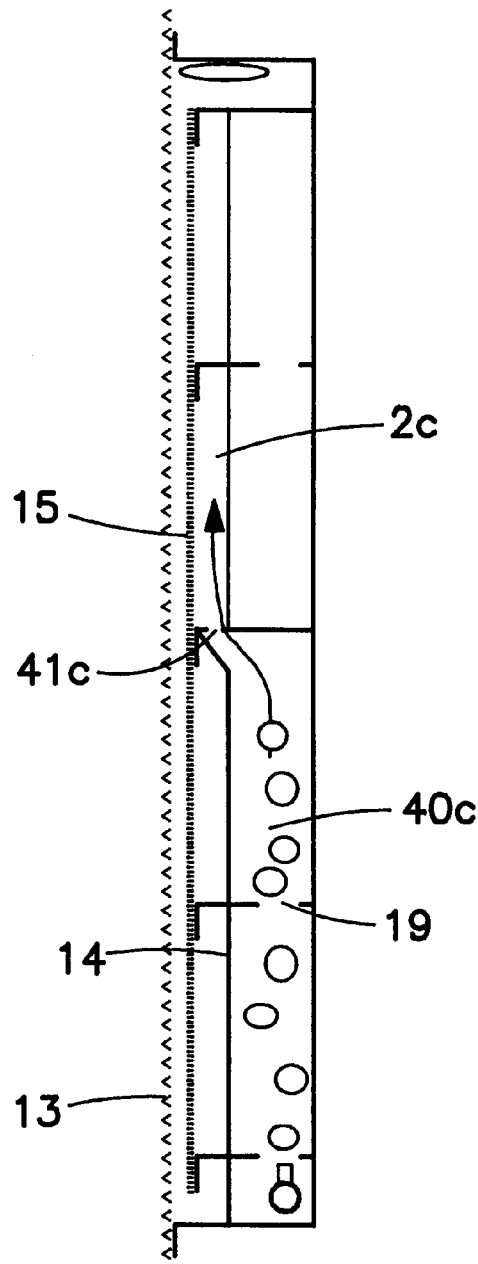
FIG. 7 is a section corresponding to the line 7–7 in FIG. 6 through the half cell according to FIG. 6.
Figure 7A:
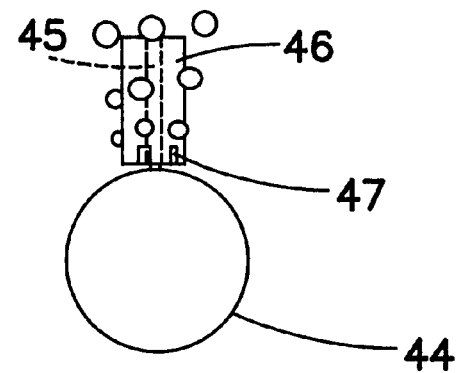
FIG. 7a is an enlarged detail of FIG. 7.
Figure 8:
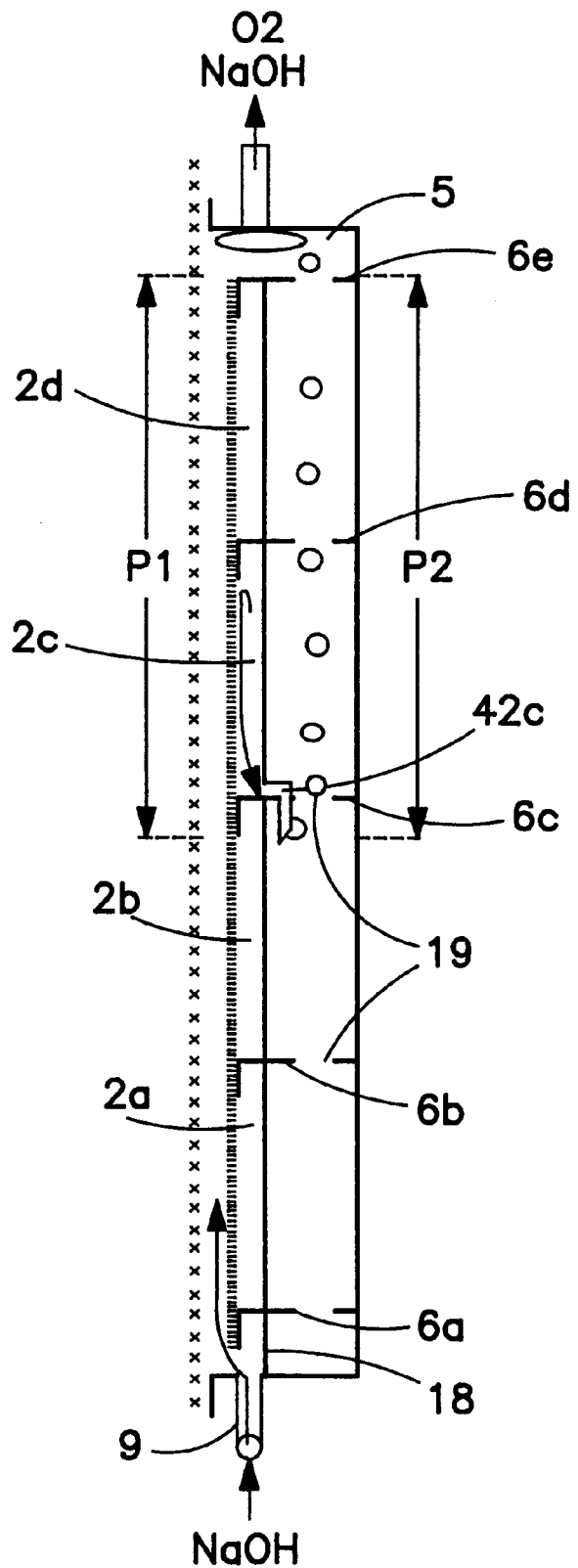
FIG. 8 is a section corresponding to the line 8–8 in FIG. 6 through the half cell according to FIG. 6.

For specific applications, for example in cases in which an accumulation of harmful or toxic gases, which is inevitable in the cascade-type arrangement of the gas pockets 2a–2d, especially in the upper gas pockets, must be avoided, a direct charging of the respective gas pocket 2a–2d with fresh electrode gas may be necessary. In the arrangement according to FIG. 6 the bubble channels 42a to 42d used for the gas outflow are designed in a similar way to those in Example 1. However, in contrast to the situation in Example 1 the respective gas inflow channels 40a, 40b, 40c and 40d are extended directly up to the respective gas pockets and lead through corresponding openings, as shown for example at 41c in section 7–7 in FIG. 7, into the gas pocket 2c. It is essential that the bubble channels 40a–40d are open at the bottom and are in direct communication with the pressure-compensating liquid (electrolyte 100). The bubble channels are fed with gas through the distribution tube 44, which feeds in each case through a nozzle 45 into the relevant bubble channel 40a–40d. Isobaric conditions exist at the respective nozzle 45 on account of the direct communication with the pressure-compensating liquid, which results in a uniform feed to the respective bubble channels. In order to prevent electrolyte 100 flowing back into the nozzles 45, the latter are covered with sealing cone-like caps 46 (see section A–A' in FIG. 7a). The controlled release of bubbles occurs through slits 47 at the lower end of the caps 46. The electrode gas flows through the gas pocket and leaves the pocket, for example pocket 2c, at the opposite end through the dip tube 42c, as is illustrated in section 8–8 in FIG. 8 together with the pressure compensation. The gaps 19 in the rear structural elements 6a–6e in turn ensure a free ascent of the bubbles and the necessary pressure compensation.

Example 5

Figure 9:
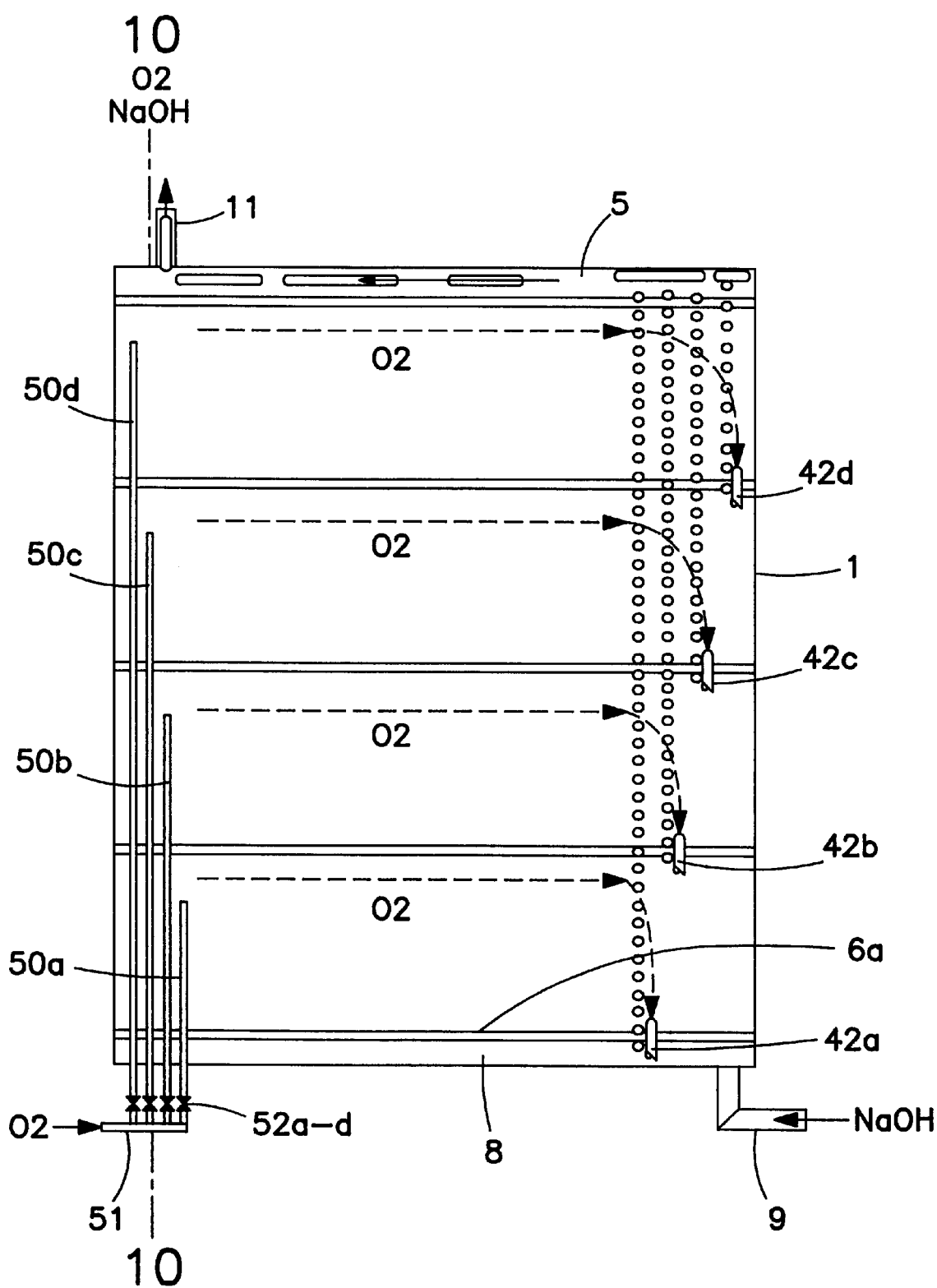
FIG. 9 is a cross-section of a variant of the half cell according to FIG. 6 with gas feed to the gas pockets through plug-in pipes.
Figure 10:
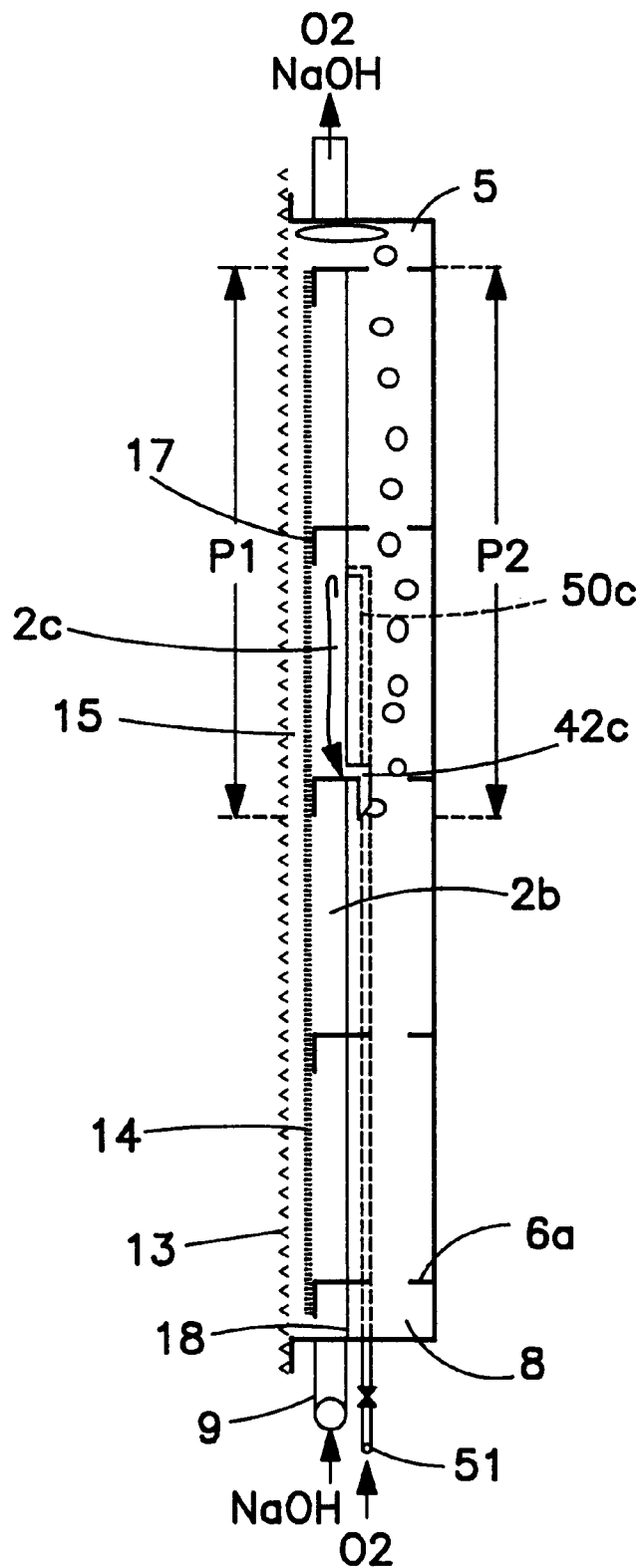
FIG. 10 is a section corresponding to the line 10–10 in FIG. 9 through the half cell according to FIG. 9.

A further variant of the half cell according to the invention is illustrated in FIG. 9: here the gas is fed into the individual gas pockets 2a–2d through direct insert tubes 50a, 50b, 50c and 50d. In order to be able to ensure a uniform feed of the gas pockets 2a–2d in this case, the individual pipes 50a–50d must be throttled with respect. to the feed pipe 51, for example by means of throttle valves 52a–52d. The adjustment may however be made in a one-off manner or in the form of a permanent installation. As illustrated in section 10–10 in FIG. 10, the unconsumed electrode gas leaves the gas pocket 2c through the dip tube 42c, in exactly the same way as described in the preceding example, after flowing through the said gas pocket 2c. In both cases the rear structural elements 6a–6e have gaps in order to ensure that gas bubbles are freely transported away and that pressure compensation can take place.

In particular, the last variant permits a particularly flat half cell construction.

What is claimed is:

1. Electrochemical half cell (1), comprising at least one electrode space (3, 15) for receiving an electrolyte (100), a gas space (2), and at least one gas diffusion electrode (14) as anode or cathode and separating the gas space (2) and electrode space (3, 15), in which the gas space (2) is subdivided into two or more superimposed gas pockets (2a, 2b, 2c, 2d) that are separated from one another and have an opening (7) for the electrolyte (100) so that the pressure on each gas pocket (2a, 2b, 2c, 2d) is in equilibrium via an opening (7) for the electrolyte (100) with the pressure of the liquid column of the electrolyte (100) in the corresponding part (15) of the electrode space (3, 15) in front of the gas diffusion electrode (14), wherein the gas inflow (7) and the gas outflow (12a, 12b, 12c, 12d) of the individual gas pockets (2a, 2b, 2c, 2d) are spatially separated from one another and the gas inflow (7) and the gas outflow (12a, 12b, 12c, 12d) are arranged laterally displaced from one another in the individual gas pockets (2a, 2b, 2c, 2d) so that there is a lateral flow of the electrode gas in the gas pocket (2a, 2b, 2c, 2d).

2. Half cell according to claim 1, wherein characterised in that the superimposed gas pockets (2a, 2b, 2c, 2d) are connected to one another in a cascade-like arrangement by connecting the gas outflow (12a, 12b, 12c, 12d) of a lower gas pocket (2a, 2b, 2c) to the gas inflow (3a, 3b, 3c, 3d) of an overlying gas pocket (2b, 2c, 2d).

3. Half cell according to claim 1, wherein characterised in that the gas pockets (2a, 2b, 2c, 2d) each have a direct gas inflow.

4. Half cell according to claim 3, wherein the gas pockets (2a, 2b, 2c, 2d) have insert pipes (50a, 50b, 50c, 50d) for direct gas inflow, which are optionally provided in addition in each case with control valves (52a, 52b, 52c, 52d) to regulate the gas flow into the gas pockets (2a, 2b, 2c, 2d).

5. Half cell according to claim 1, wherein characterised in that the gas pockets 2a, 2b, 2c, 2d) have a dip tube (42a, 42b, 42c, 42d) for removing excess gas from the gas pocket (2a, 2b, 2c, 2d).

6. Half cell according to claim 1, wherein characterised in that the gas pockets (2a, 2b, 2c, 2d) have bubble channels (3a, 3b, 3c, 3d) for receiving inflowing electrode gas, which are directly or indirectly connected to the opening (7).

7. Half cell according to claim 1, wherein characterised in that the gas pockets (2a, 2b, 2c, 2d) have lateral gas collecting aprons (32a, 32b, 32c, 32d) as gas inflows and/or lateral aprons (31a, 31b, 31c, 31d) as gas outflows.

8. Half cell according to claim 1, wherein the gas pockets (2a, 2b, 2c, 2d) have open bubble channels (40a, 40b, 40c, 40d) for the electrolyte (100) for a direct independent gas feed.

9. Half cell according to claim 8, wherein the gas feed to the bubble channels (40a, 40b, 40c, 40d) takes place via throttled nozzles (45), which are optionally covered by sealing cones (46) having side slits.

10. Half cell according to claim 1, wherein characterised in that the gas inflow (7) and the gas outflows (12a, 12b, 12c, 12d) of superimposed gas pockets (2a, 2b, 2c, 2d) lie on alternate sides or in each case on the same side.

11. Half cell according to claim 1, wherein the electrolyte gap (15) and electrolyte rear space (3) are hydraulically separable to adiust the differential pressure between the regions in front of and behind the gas diffusion electrode (14).

12. Half cell according to claim 1, comprising a connecting pipe (10) through which the gas inflow into the lowermost gas pocket (2a) takes place coaxially together with the electrolyte inflow (9) into the electrode space (3, 15) and/or the discharge of the excess gas together with the electrolyte takes place at the top through an outflow pipe (11).

13. Half cell according to claim 1, wherein the electrolyte gap (15) is hydraulically connected at the top to the electrolyte rear space (3) behind the gas pockets (2a, 2b, 2c, 2d), overflows into the latter, and the discharge of the excess gas together with the electrolyte (22) occurs downwardly through a stand pipe in the region behind the gas pockets (2a, 2b, 2c, 2d) or occurs sideways through a laterally arranged pipe with a gas-liquid separator situated at the same height.

14. Half cell according to claim 13, wherein the height of the stand pipe in the electrolyte rear space 3 behind gas pockets (2a, 2b, 2c, 2d), the height of the laterally arranged pipe or both, are adjustable to admust the liquid level of the electrolyte (100) differently relative to the level of the electrolyte (100) in the electrolyte gap (15) to vary the differential pressure between the gas space (2) and electrolyte gap (15) for all gas pockets (2a, 2b, 2c, 2d).

* * * * *